(12) United States Patent
McCormack

(10) Patent No.: US 11,524,619 B2
(45) Date of Patent: Dec. 13, 2022

(54) TIE-DOWN LOOP ASSEMBLY

(71) Applicant: Brian P McCormack, Grosse Pointe Woods, MI (US)

(72) Inventor: Brian P McCormack, Grosse Pointe Woods, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/102,577

(22) Filed: Nov. 24, 2020

(65) Prior Publication Data
US 2021/0155147 A1 May 27, 2021

Related U.S. Application Data

(60) Provisional application No. 62/940,614, filed on Nov. 26, 2019.

(51) Int. Cl.
*B60P 7/08* (2006.01)

(52) U.S. Cl.
CPC .................. *B60P 7/0807* (2013.01)

(58) Field of Classification Search
CPC .............. B60P 3/075; B60P 7/08; B60P 3/122
USPC ....... 410/101, 106, 110, 116, 102, 105, 107, 410/109
See application file for complete search history.

(56) References Cited

U.S. PATENT DOCUMENTS

| 5,774,948 | A | 7/1998 | Petschke et al. | |
| 5,961,241 | A * | 10/1999 | Haker | B60P 7/0807 |
| | | | | 403/155 |
| 8,388,286 | B2 | 3/2013 | Niklas et al. | |
| 9,045,070 | B2 | 6/2015 | Pauluk et al. | |
| 9,610,887 | B1 | 4/2017 | Parra Becerra | |
| 9,896,018 | B2 * | 2/2018 | Hemphill | B60P 7/0807 |
| 10,369,920 | B2 * | 8/2019 | Sbongk | B60P 7/0807 |
| 11,097,645 | B2 * | 8/2021 | Buczynski | B60P 7/0807 |

\* cited by examiner

*Primary Examiner* — D Glenn Dayoan
*Assistant Examiner* — Sunsurraye Westbrook
(74) *Attorney, Agent, or Firm* — Ralph E. Smith

(57) ABSTRACT

A tie-down loop assembly is configured to attach to a mounting surface and includes a mounting bracket, a biasing member, and a loop-isolator assembly. The mounting bracket has at least one carrier feature that has a carrier articulation axis. The loop-isolator assembly includes a loop having a substantially straight portion with a loop articulation axis and an isolator coupled to the loop straight portion. The isolator has a contact element and a loop-isolator articulation axis located coincidentally with the carrier articulation axis. When an articulation force is applied to the loop-isolator assembly, it causes the loop-isolator assembly to articulate relative to the mounting bracket, while the isolator contact element slippingly engages the biasing member movable portion. The engagement applies a biasing force to the contact element causing resistance to articulate the loop-isolator assembly relative to the bracket.

16 Claims, 7 Drawing Sheets

TIE-DOWN LOOP ASSEMBLY

CROSS-REFERENCE TO RELATED APPLICATION(S)

This application claims the benefit of U.S. Provisional Application No. 62/940,614, filed on Nov. 26, 2019. The disclosure of this application is incorporated herein by reference in its entirety.

FIELD

This application generally relates to cargo securing systems and, more particularly, to tie-down loop assemblies.

BACKGROUND

It is known to provide a storage area of a vehicle, such as a pickup truck bed, with tie-down loop assemblies adapted to receive hooked straps, bungee cords, ropes, or other securing devices. The assemblies facilitate securing transported items during vehicle operation to prevent the items from moving and becoming damaged. The loops are often an articulating variety and are designed to articulate about a mounting component to provide options for securing the cargo or to move between stowed and deployed positions.

One potential drawback to many articulating loop assemblies is unwanted movement when the loop is not being used. This movement may cause wear of the assembly and may also produce bump, squeak, and rattle (BSR) noise, which vehicle occupants may notice. Another potential drawback to many articulating loop assemblies is difficultly articulating the loop about the mounting component due to paint or other coating material applied to the components. The components are often made of metal and painted or coated for aesthetic and corrosion prevention purposes. The components are often coated after being assembled, which may potentially result in inadequate coating coverage where the loop meets the mounting component and may potentially cause resistance to articulate the loop, until enough coating breaks away due to articulating movement. Areas where coating breaks away are then susceptible to corrosion and poor aesthetic appearance. Thus, while such articulating loop assemblies do work well for their intended purpose, there remains a desire for improvement in the relevant art.

SUMMARY

In one example aspect of the invention, a tie-down loop assembly is provided. In this example, the assembly includes a mounting bracket, a loop, an isolator made of plastic resin, and a biasing member. The isolator is coupled to the loop and includes a contact element. A loop-isolator assembly pivotally articulates about an articulation axis once assembled to the mounting bracket. The biasing member mates to a back side of the mounting bracket and exerts a biasing force on the isolator contact element. When an indexing feature on the contact element engages the biasing member, such as when the loop-isolator assembly is in a stowed position, the biasing force prevents unwanted articulation of the loop, which reduces wear and BSR noise. The loop can be articulated to a use position by overcoming the biasing force of the biasing member onto the isolator indexing feature.

Further areas of applicability of the teachings of the present disclosure will become apparent from the detailed description, claims, and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application, or uses. Thus, variations that do not depart from the gist of the present disclosure are intended to be within the scope of the present disclosure.

DESCRIPTION

Figure 1:
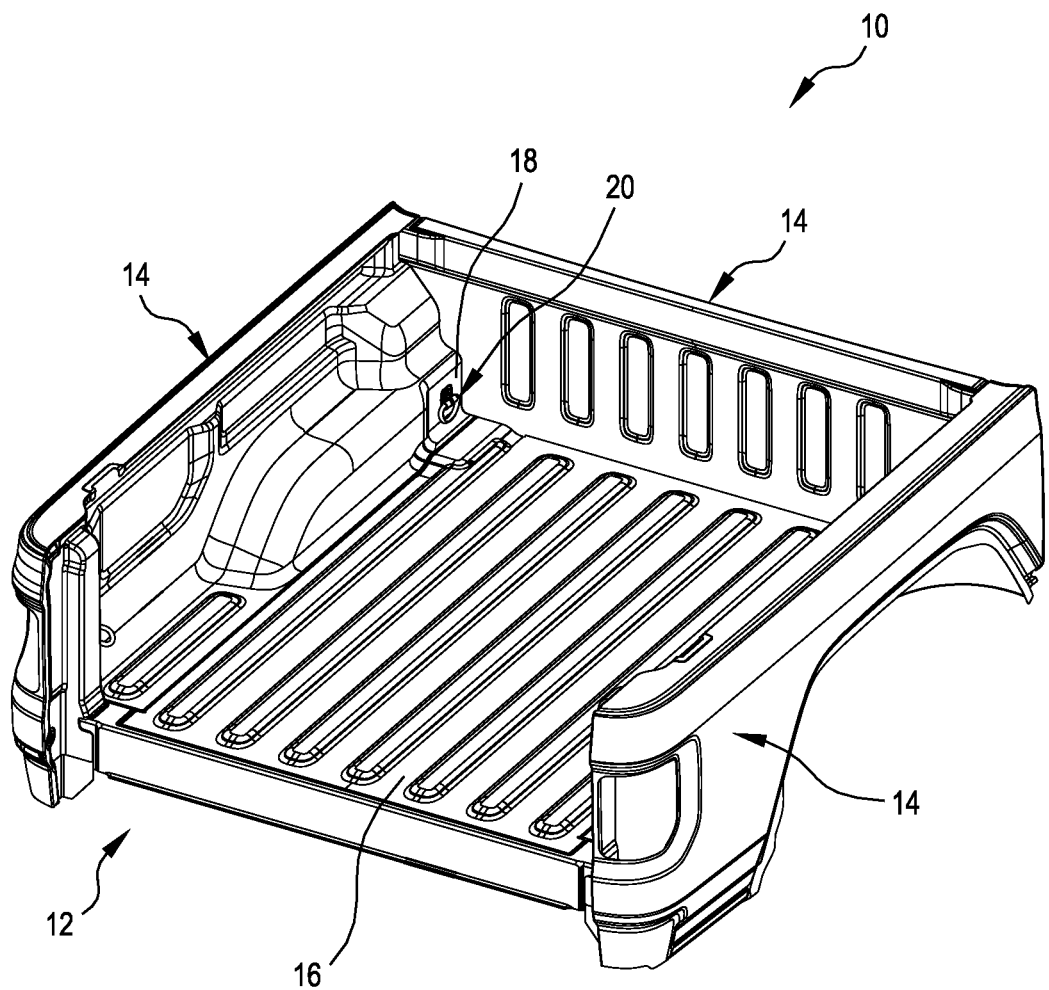
FIG. 1 is a perspective view of a cargo securing system with a tie-down loop assembly in accordance with the principles of the present disclosure.

With initial reference to FIGS. 1 and 2, a cargo securing system constructed according to one example of the present disclosure is shown and generally identified at reference numeral 10. The cargo securing system 10 is configured for use in a vehicle having a cargo space 12. Example vehicles include pickup trucks, sport utility vehicles, vans, passenger cars, and trailers. The cargo space 12 illustrated in FIG. 1 is that of a pickup truck bed. The pickup truck bed cargo space 12 includes at least one mounting component 14 and a load floor 16. The mounting component includes a mounting surface 18. A tie-down loop assembly 20 is fixedly or removably attached to mounting surface 18. The mounting components and load floor of FIGS. 1 and 2 are illustrated as separate bed walls and load floor with the tie-down loop assembly 20 attached to the mounting surface 18 on a bed wall, but it should be noted that the tie-down loop assembly 20 can be attached to a mounting surface located on the load floor 16.

Figure 3:
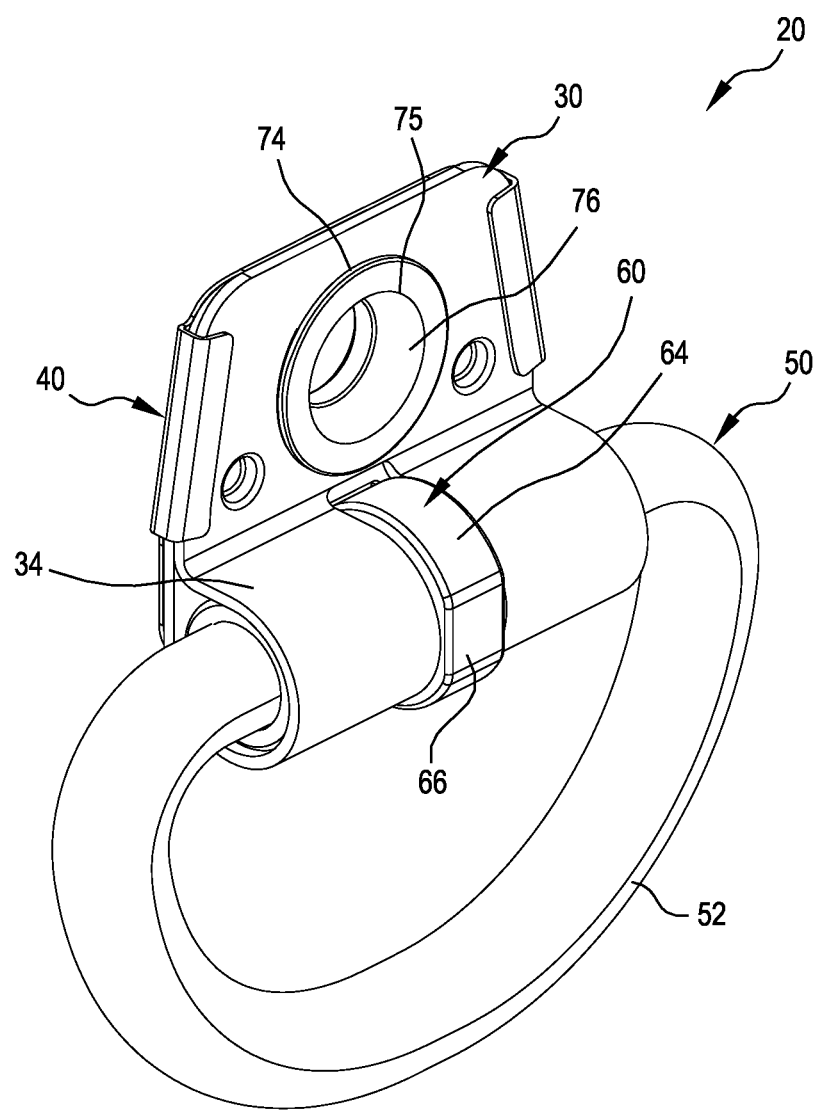
FIG. 3 is a perspective view of the tie-down loop assembly, in accordance with the principles of the present disclosure.
Figure 4:
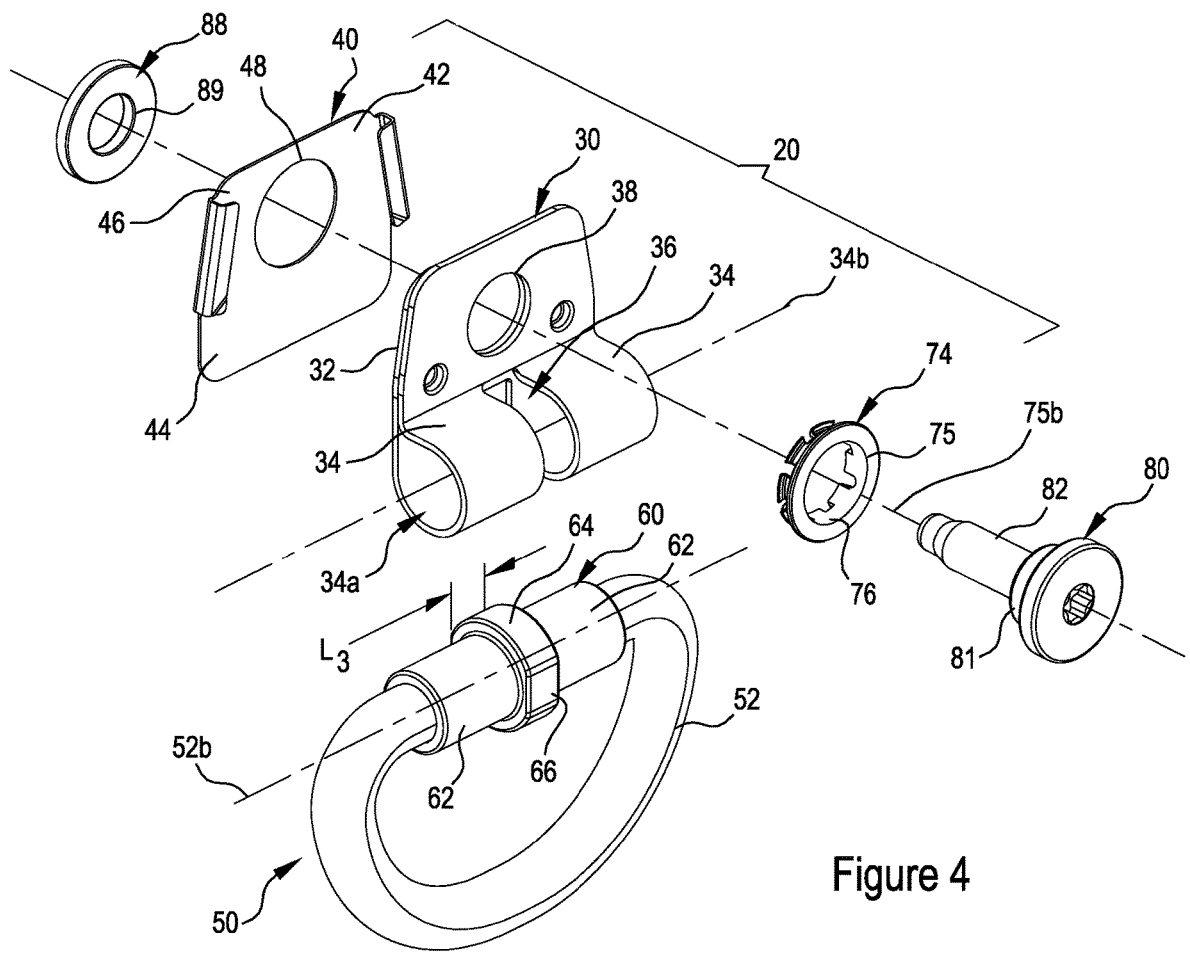
FIG. 4 and FIG. 4a are exploded views of the tie-down loop assembly, in accordance with the principles of the present disclosure.
Figure 4A:
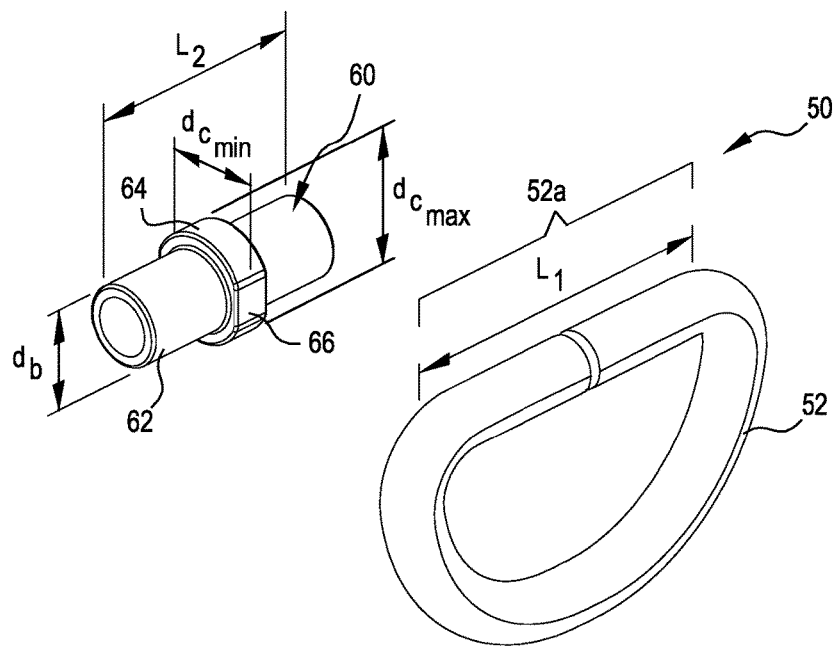

With reference now to FIGS. 3 and 4, aspects of an example tie-down loop assembly 20 are described. The tie-down loop assembly 20 generally includes a mounting bracket 30, a biasing member 40, a loop-isolator assembly 50, and a bushing 74.

The mounting bracket 30 includes a back side surface 32, at least one carrier feature 34, void space 36, and hole 38. The at least one carrier feature 34 has a generally cylindrical interior portion 34a and a carrier articulation axis 34b. The biasing member 40 includes a front side surface 42, a movable portion 44, and a fixed portion 46 having a hole 48. In an assembled position, mounting bracket back side surface 32 contacts biasing member front surface 42 and carrier hole 38 is coaxial with biasing member hole 48.

The loop-isolator assembly 50 includes loop 52, which has a substantially straight portion 52a that has a length $L_1$, and isolator 60, which has a main body 62 with a generally cylindrical shape of diameter $d_b$ and length $L_2$. Isolator main body length $L_2$ is less than or equal to loop straight portion 52a length $L_1$ such that isolator 60 is concentrically located around loop straight portion 52a and within length $L_1$. Loop straight portion 52a and concentrically located isolator 60 share a loop-isolator axis 52b. Isolator 60 is rotationally fixed to loop 52 such that isolator 60 does not rotate about loop-isolator axis 52b independent of loop 52.

Isolator 60 further includes a contact element 64, which has a length $L_3$ and a generally cylindrical shape with a major diameter $d_{cmax}$, and is concentrically located around isolator main body 62 such that contact element major diameter $d_{cmax}$ is greater than main body diameter $d_b$. Contact element 64 includes at least one indexing feature 66 such that a contact element minor diameter $d_{cmin}$ through the at least one indexing feature 66 is less than major diameter $d_{cmax}$. Indexing feature 66 is illustrated as a flat surface on generally cylindrical contact element 64, but it should be appreciated that indexing feature 66 can be of any shape that creates a contact element minor diameter $d_{cmin}$ that is less than major diameter $d_{cmax}$.

In an assembled position, loop-isolator axis 52b is coincident with carrier articulation axis 34b such that isolator main body 62 is within carrier interior portion 34a and isolator contact element 64 is within mounting bracket void space 36. In another example aspect of the invention (not shown) mounting bracket 30 has one carrier feature 34, and void space 36 is adjacently located along carrier articulation axis 34b.

In another example aspect of the invention, tie-down loop assembly 20 is attached to mounting surface 18 via a fastener connection. Bushing 74, which includes pass-through hole 75, is concentrically located within mounting bracket hole 38. Fastener shank portion 82 is assembled through bushing pass-through hole 75 such that fastener cylindrical shoulder surface 81 is concentric within bushing hole 75 and in slipping engagement with bushing hole surface 76. Fastener shank portion 82 is also assembled through biasing member hole 48 and washer pass-through hole 89 of washer 88 and engages a cooperating fastener hole in mounting surface 18 (not shown) to attach tie-down loop assembly 20 to mounting surface 18.

Figure 2A:
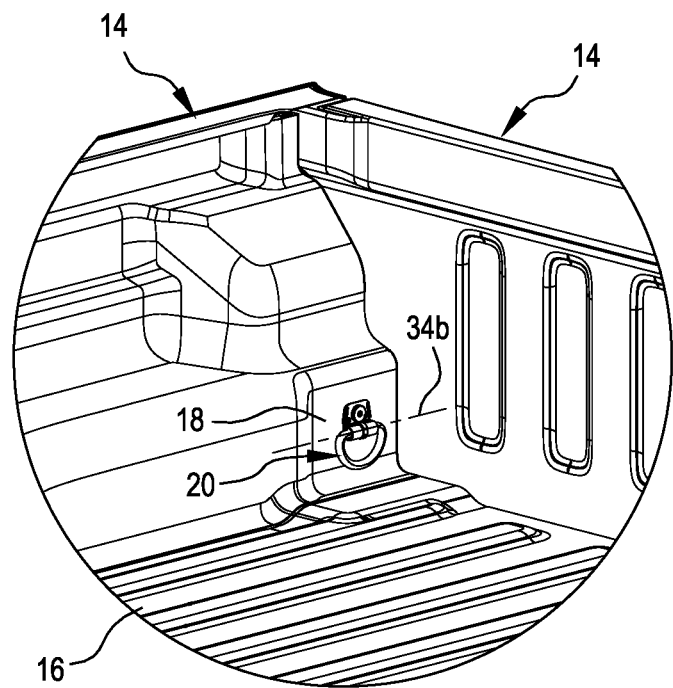
FIG. 2a is a partial perspective view of the cargo securing system with the tie-down loop assembly shown in FIG. 1, in accordance with the principles of the present disclosure.
Figure 2B:
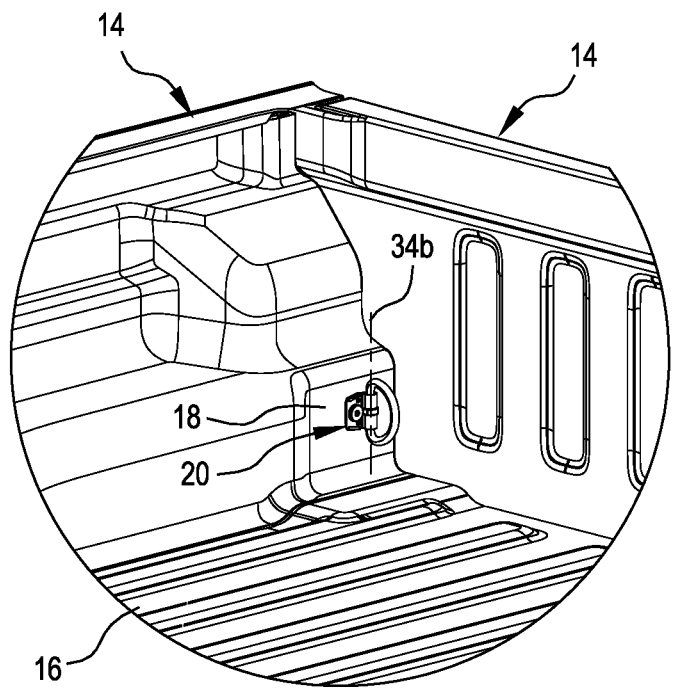
FIG. 2b is a partial perspective view of the cargo securing system with the tie-down loop assembly shown in FIG. 2a in a rotated orientation, in accordance with the principles of the present disclosure.

Tie-down loop assembly 20 can rotate about rotation axis 75b, due to the slipping engagement of fastener cylindrical shoulder surface 81 with bushing hole surface 76. FIG. 2a shows a tie-down loop assembly 20 with articulation axis 34b in a generally horizontal orientation. FIG. 2b shows a tie-down loop assembly 20 with articulation axis 34b in a generally vertical orientation. It should be appreciated that tie-down loop assembly 20 rotation about rotation axis 75b is not limited to these two orientations.

In another example aspect of the invention, tie-down loop assembly 20 is attached to mounting surface 18 via a welded connection (not shown), which eliminates a need for bushing 74, mounting bracket hole 38, biasing member hole 48, and washer 88. While a welded connection prohibits rotation about rotation axis 75b, the articulation of loop-isolator assembly 50 about articulation axis 34b is preserved. It should also be appreciated that other attachment means are contemplated.

Figure 5:
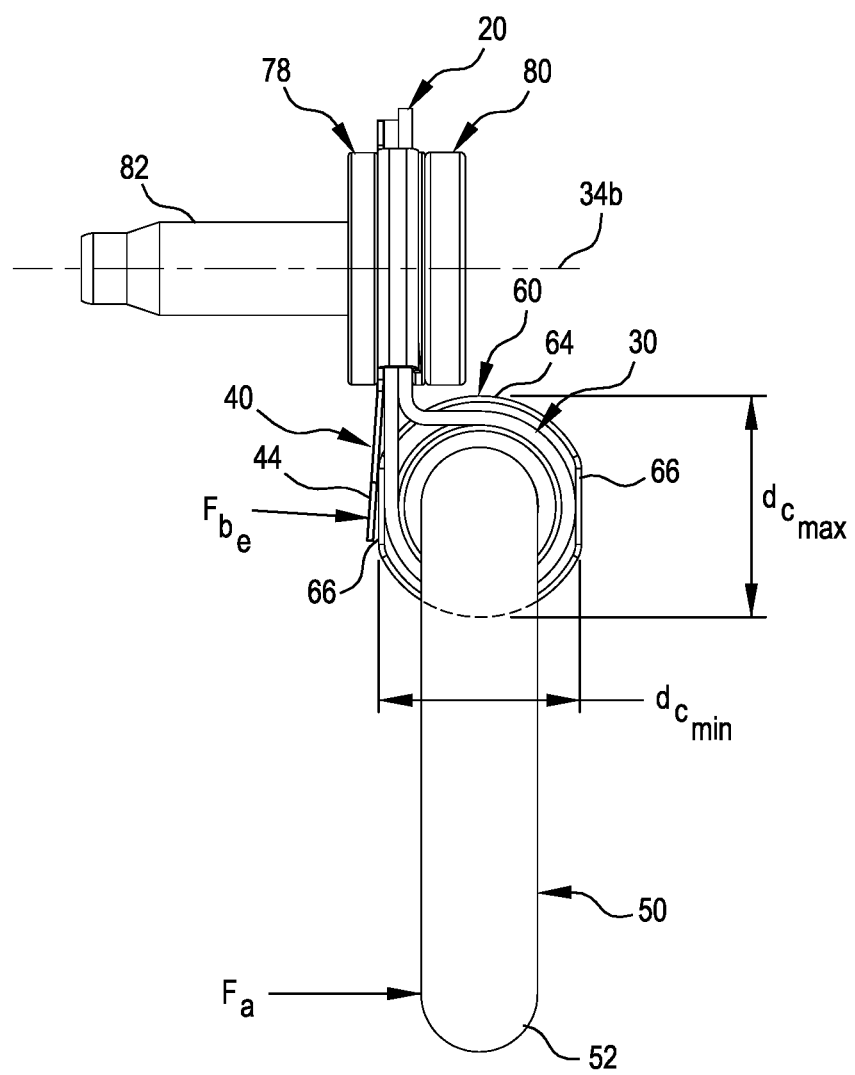
FIG. 5 is a side view of the tie-down loop assembly with a loop in a stowed position, in accordance with the principles of the present disclosure.
Figure 6:
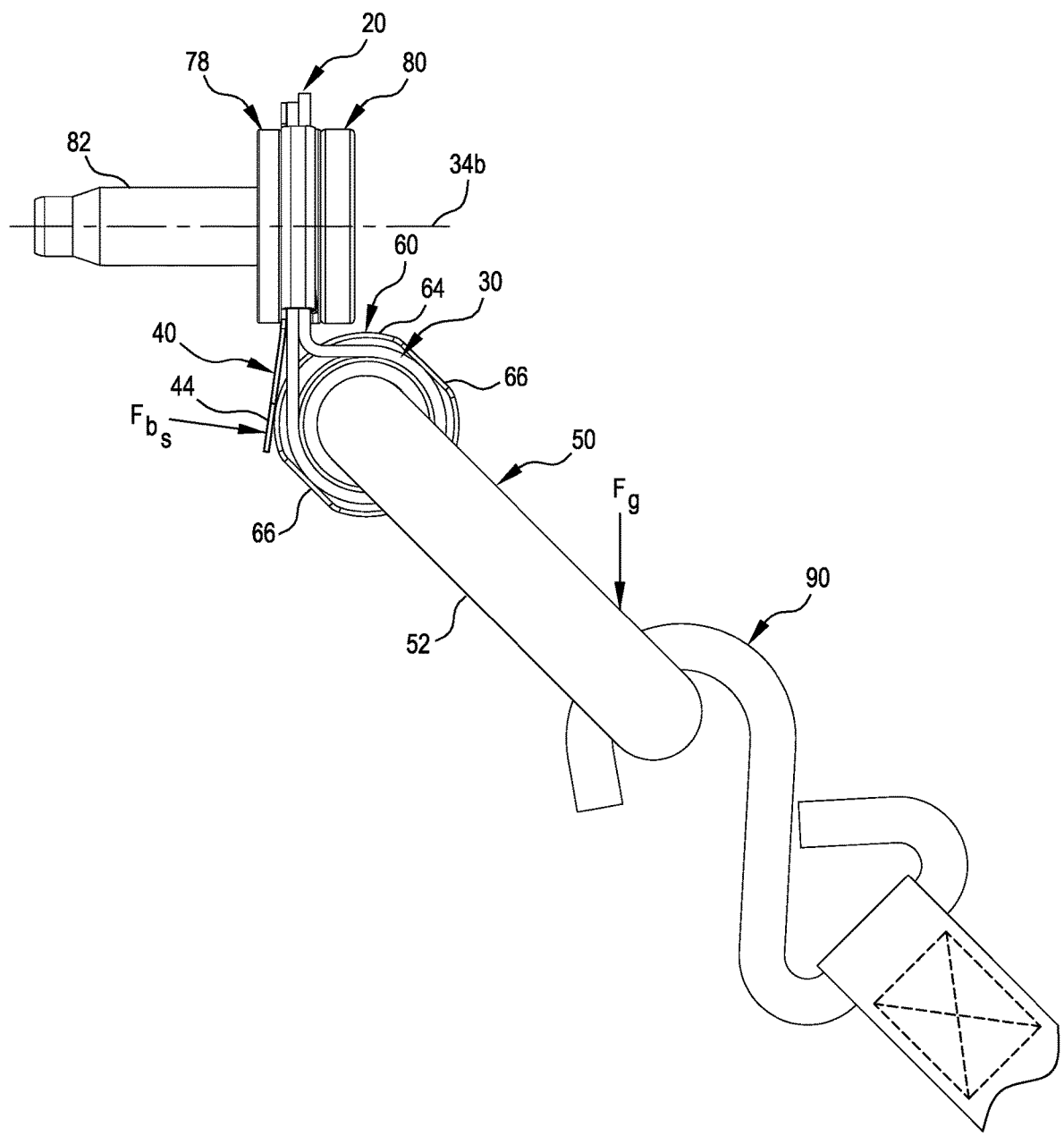
FIG. 6 is a side view of the tie-down loop assembly with a loop in a deployed position, in accordance with the principles of the present disclosure.
Figure 7:
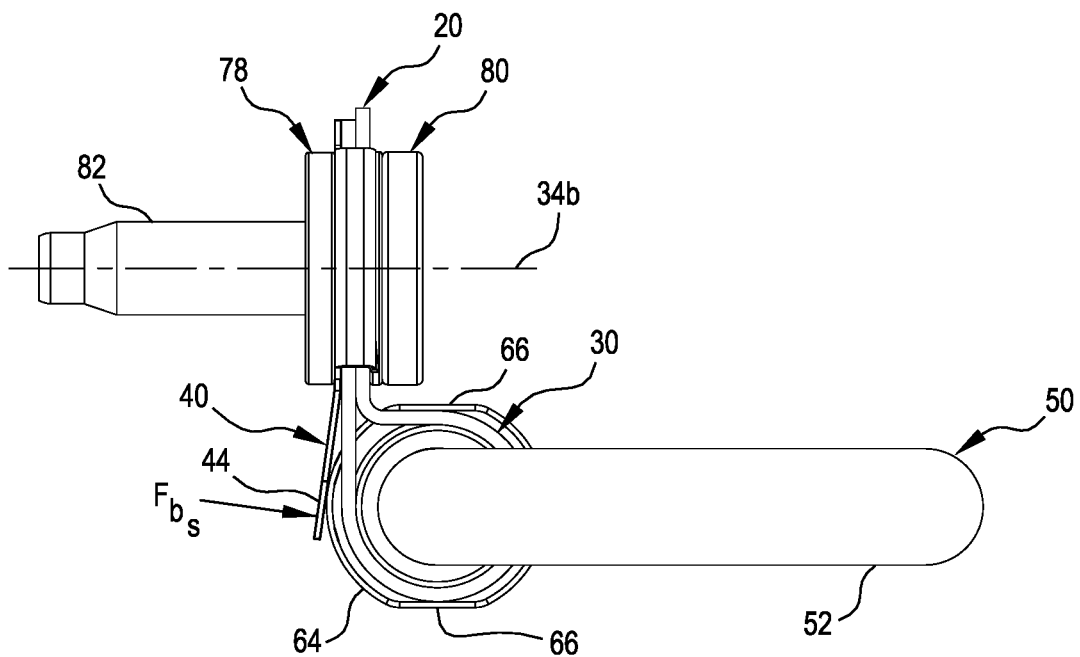
FIG. 7 is a side view of the tie-down loop assembly with a loop in a deployed position, in accordance with the principles of the present disclosure.
Figure 8:
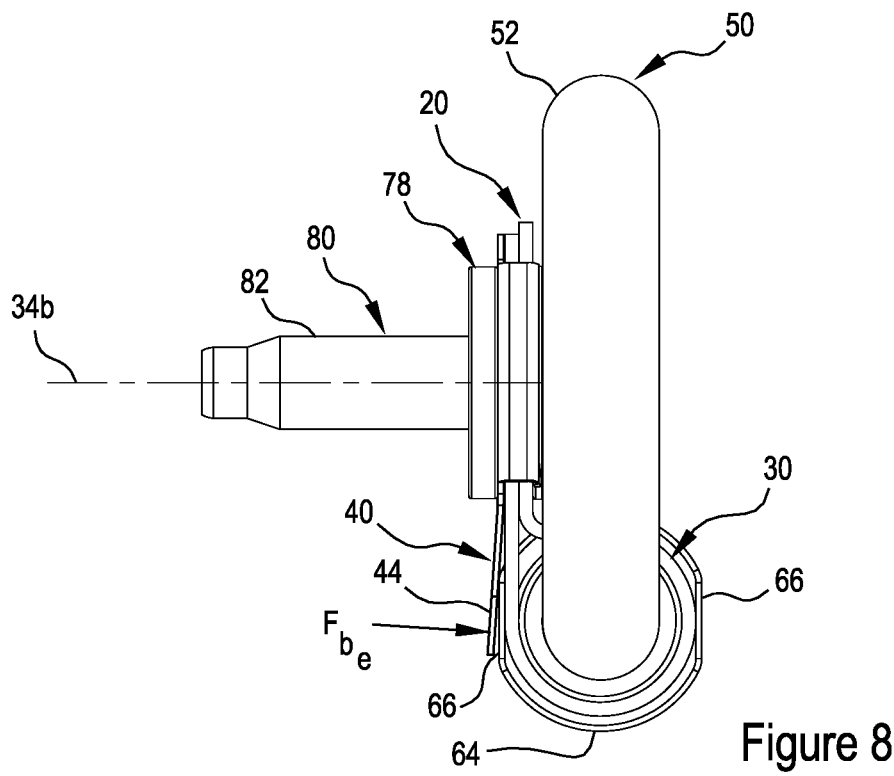
FIG. 8 is a side view of the tie-down loop assembly with a loop in a stowed position, in accordance with the principles of the present disclosure.

With reference now to FIGS. 5 through 8, additional aspects of an example tie-down loop assembly 20 are described. Loop-isolator assembly 50 is configured to articulate about articulation axis 34b relative to mounting bracket 30 to establish stowed and deployed positions. FIGS. 5 and 8 illustrate stowed positions. In stowed positions, indexing feature 66 of contact element 64 is in engaging contact with movable portion 44 of biasing member 40. Movable portion 44 exerts a biasing force $F_{be}$ against indexing feature 66, which prevents loop-isolator assembly 50 from articulating about articulation axis 34b until an articulation force Fa that overcomes biasing force $F_{be}$ is applied to loop 52. An articulation force Fa that overcomes biasing force $F_{be}$ causes loop-isolator assembly 50 to articulate about articulation axis 34b. This articulation causes contact element 64 to deflect movable portion 44 and remove indexing feature 66 from engaging contact with movable portion 44. As a result, loop-isolator assembly 50 is in a deployed position, as illustrated in FIGS. 6 and 7.

In another example aspect of the invention, biasing member front side surface 42 and mounting bracket back side surface 32 contact an intervening spacer component (not shown). The intervening component does not prevent isolator contact element 64 from entering engaging contact with movable portion 44 of biasing member 40.

Biasing member 40 and isolator 30 features are designed such that vibrations from typical vehicle operation do not impart an articulation force Fa that can overcome biasing force $F_{be}$, which reduces the occurrence of loop-isolator movement that causes wear of the components and bump, squeak, and rattle noise, which vehicle occupants may notice. An articulation force Fa to induce purposefully articulation, such as when articulating the loop-isolator assembly 50 by hand to attach a cargo securing device 90, like a hooked strap, bungee cord, rope, or the equivalent to secure cargo, is necessary to overcome biasing force $F_{be}$.

In deployed positions, movable portion 44 and contact element 64 are in slipping contact, and movable portion 44 applies a biasing force $F_{bs}$ against contact element 64. Biasing force $F_{bs}$ is of a magnitude such that a gravitational force $F_g$ acting on the loop-isolator assembly does not articulate loop-isolator assembly 50 while in a deployed position. Therefore, the biasing force $F_{bs}$ prevents unintended articulation of loop-isolator 50 while attaching a cargo securing device 90.

In another example aspect of the invention, a tie-down loop assembly 20 is described. The assembly includes a mounting bracket 30, a loop 52 made of metal, an isolator 60 made of plastic resin, and a biasing member 30 made of metal. The isolator 60 is coupled to a substantially straight portion 52a of loop 52 by a process such as plastic injection overmolding to produce a loop-isolator assembly 50. It should be appreciated that other means to couple isolator 60 onto substantially straight portion 52a are contemplated. The loop-isolator assembly 50 is then coated by an electrophoretic painting process, also known as e-coating. The type of e-coating material used does not substantially adhere to the plastic isolator 60.

In an assembled position, loop-isolator axis 52b is coincident with carrier articulation axis 34b such that isolator main body 62 is within carrier interior portion 34a and isolator contact element 64 is within mounting bracket void space 36. The loop-isolator assembly 50 is then powder coated to provide a finished appearance and further corrosion prevention. The type of powder coating used does not substantially adhere to the plastic isolator 60.

The loop-isolator assembly 50 pivotally articulates about carrier articulation axis 34b once installed in carrier feature 34. The isolator 60 prevents coated movable and articulating components from contacting. Such contacting of coated movable and articulating components could necessitate a higher-than-desired articulation force Fa to articulate the loop-isolator assembly 50 within carrier 34. Such a contacting could also degrade any corrosion prevention of the coatings adhered to the components due to articulation of loop-isolator assembly 50 within carrier 34.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A tie-down loop assembly configured to attach to a mounting surface, the assembly comprising:
    a mounting bracket with a back side and a carrier feature, the carrier feature defining a carrier articulation axis;
    a biasing member coupled to the mounting bracket, the biasing member having a fixed portion and a movable portion, the fixed portion positioned proximate to the mounting bracket backside; and
    a loop-isolator assembly including:
        a loop having a substantially straight portion and defining a loop articulation axis, and
        an isolator coupled to the loop substantially straight portion, the isolator having a contact element,
    wherein the loop-isolator assembly is pivotally coupled to the carrier feature such that the loop articulation axis locates coincidentally with the carrier articulation axis and the biasing member movable portion is in biased engagement with the contact element,
    wherein the biased engagement applies a biasing force to the contact element causing a resistance to articulation of the loop-isolator assembly relative to the mounting bracket, and
    wherein an articulation force greater than a predetermined threshold applied to the loop-isolator assembly causes the loop-isolator assembly to overcome the resistance and articulate relative to the mounting bracket, while the isolator contact element slippingly engages the biasing member.

2. The tie-down loop assembly of claim 1, wherein the contact element is comprised of an indexing feature, the indexing feature configured to contact the biasing member and impede articulation of the loop-isolator.

3. The tie-down loop assembly of claim 2, wherein the articulation force applied to the loop-isolator assembly allows the contact element to displace the biasing member and allows the loop-isolator assembly to articulate.

4. The tie-down loop assembly of claim 1, wherein a gravitational force applied to the loop-isolator assembly does not overcome the biasing force.

5. The tie-down loop assembly of claim 2, wherein the loop-isolator assembly has a stowed position and a deployed position.

6. The tie-down loop assembly of claim 5, wherein the loop-isolator assembly is in a stowed position when the indexing feature contacts the biasing member and is in a deployed position when the indexing feature is not in contact with the biasing member.

7. The tie-down loop assembly of claim 1, wherein the loop is made of metal and the isolator is made of plastic resin;
    wherein the loop-isolator assembly is then powder coated; and
    wherein the powder coating is configured to not adhere to the plastic isolator.

8. A cargo securing system for a vehicle comprising:
    a cargo space;
    a mounting surface in the cargo space;
    a tie-down loop assembly, the tie-down loop assembly comprising
    a mounting bracket with a back side and a carrier feature, the carrier feature defining a carrier articulation axis;
    a biasing member coupled to the mounting bracket, the biasing member having a fixed portion and a movable portion, the fixed portion positioned proximate to the mounting bracket backside; and
    a loop-isolator assembly including:
        a loop having a substantially straight portion and defining a loop articulation axis, and
        an isolator coupled to the loop substantially straight portion, the isolator having a contact element,
    wherein the loop isolator assembly is pivotally coupled to the carrier feature such that the loop articulation axis locates coincidentally with the carrier articulation axis and the biasing member movable portion is in biased engagement with the contact element,
    wherein the biased engagement applies a biasing force to the contact element causing a resistance to articulation of the loop-isolator assembly relative to the mounting bracket, and
    wherein an articulation force greater than a predetermined threshold applied to the loop-isolator assembly causes the loop-isolator assembly to overcome the resistance and articulate relative to the mounting bracket, while the isolator contact element slippingly engages the biasing member.

9. The cargo securing system of claim 8, wherein the contact element is comprised an indexing feature, the indexing feature configured to contact the biasing member and impede articulation of the loop-isolator.

10. The cargo securing system of claim 9, wherein the articulation force applied to the loop-isolator assembly allows the contact element to displace the biasing member and allows the loop-isolator assembly to articulate.

11. The cargo securing system of claim 8, wherein a gravitational force applied to the loop-isolator assembly does not overcome the biasing force.

12. The cargo securing system of claim 9, wherein the loop-isolator assembly has a stowed position and a deployed position.

13. The cargo securing system of claim 12, wherein the loop-isolator assembly is in a stowed position when the indexing feature contacts the biasing member and is in a deployed position when the indexing feature is not in contact with the biasing member.

14. The cargo securing system of claim 8, wherein the tie-down loop assembly further comprises a biasing member hole and a mounting bracket hole configured to concentrically receive a bushing;
    wherein the bushing is configured to slippingly engage a fastener; and wherein the fastener is positioned concentric within the bushing and engages a cooperating fastener hole in the mounting surface.

15. The cargo securing system of claim 14, wherein the fastener defines a rotation axis; and
wherein the tie-down loop assembly rotates about the rotation axis.

16. The cargo securing system of claim 8, wherein the loop is made of metal and the isolator is made of plastic resin;
wherein the loop-isolator assembly is then powder coated; and
wherein the powder coating is configured to not adhere to the plastic isolator.

* * * * *